Patented July 18, 1933

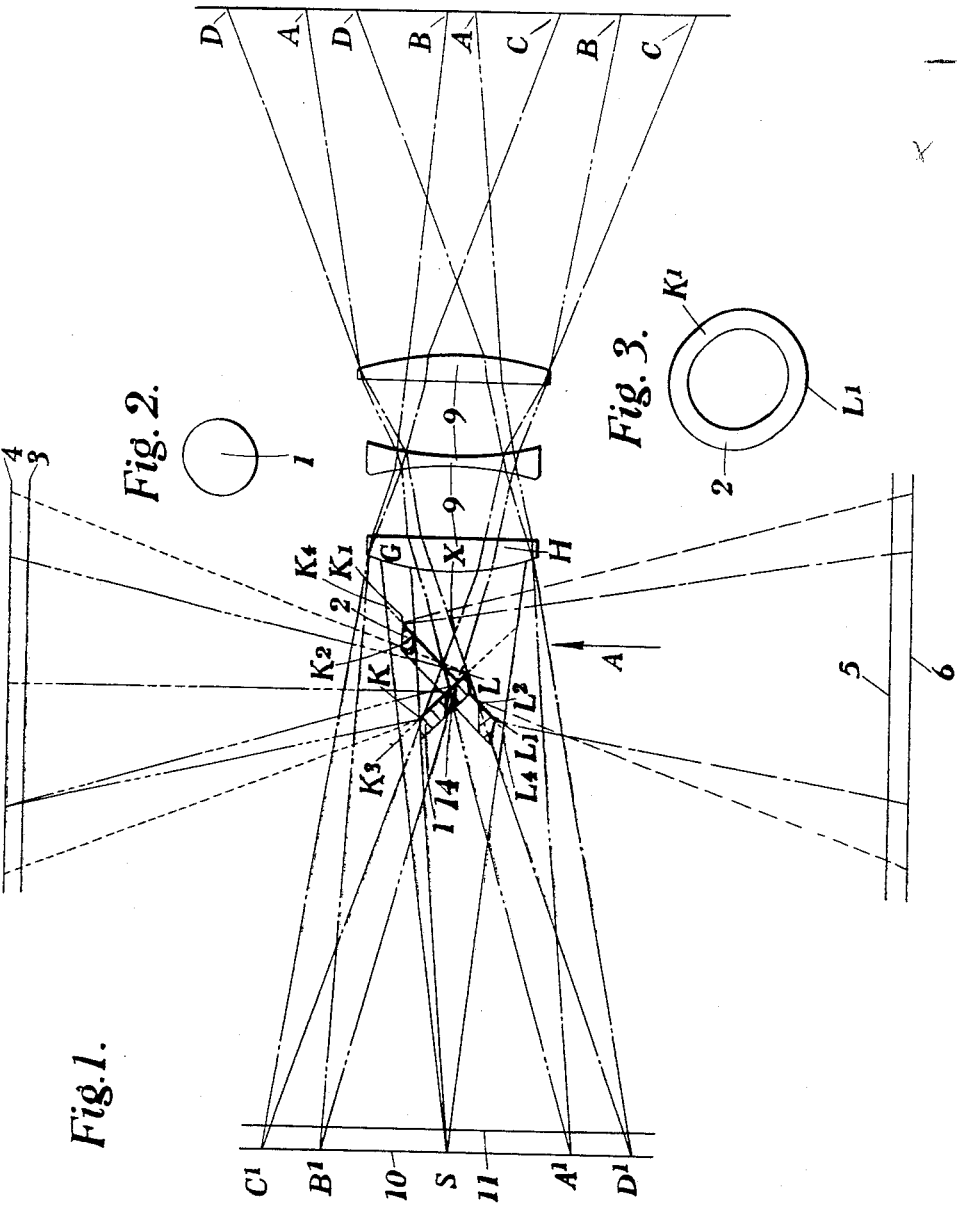

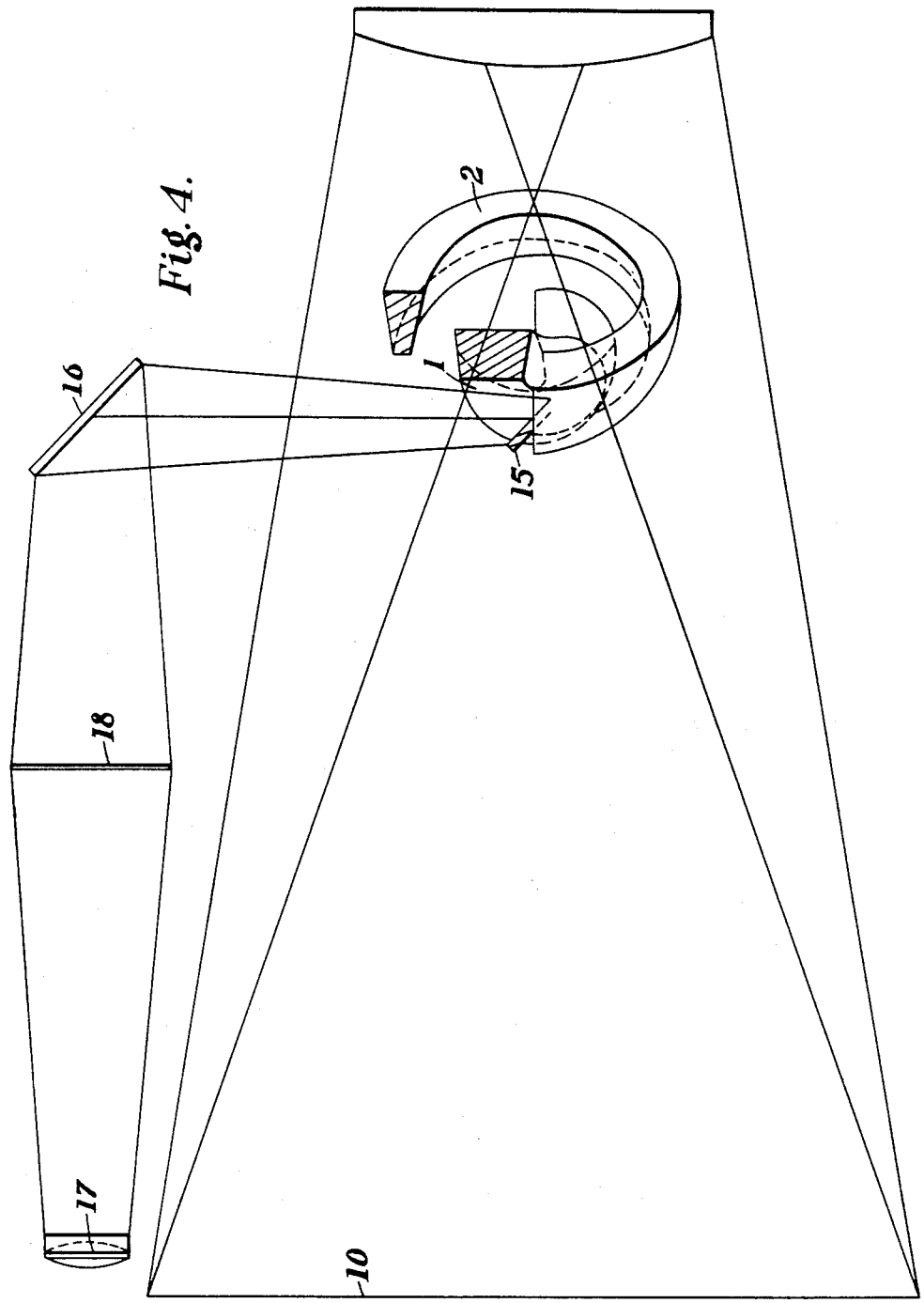

1,919,022

UNITED STATES PATENT OFFICE

ALBERT GEORGE HILLMAN, OF LONDON, ENGLAND, ASSIGNOR TO COLOURGRAVURE LIMITED, OF LONDON, ENGLAND

OPTICAL SYSTEM FOR CAMERAS FOR PHOTOGRAPHY OR CINEMATOGRAPHY PARTICULARLY IN COLOR

Application filed May 29, 1931, Serial No. 541,001, and in Great Britain July 4, 1930.

The present invention relates to improvements in optical systems for cameras for photography or cinematography particularly color photography or cinematography, and more especially to two, three or four color photographic or cinematographic cameras in which branch beams are separated from the entering beam of light by intersecting reflectors, the direct beam passing unobstructed to the focal plane, while the branch beams are reflected by optical flats, which may be of polished steel, to their respective focal planes which may be parallel to the axes of the direct beam, although means may be provided if desired to bring the axes of the direct beam and the branch beam or beams into parallelism.

The present invention is particularly applicable for use as a behind lens optical combination and in such use broadly consists of reflectors in the form of two optical flats, disposed in intersecting planes, the angle of intersection being, for example, 90°, and so formed, that the system divides the main image forming beam into four beams adapted to produce complete images at three or four focal planes, two beams combining to form one image in the case where three images are produced, the division of the main beam by the reflecting surfaces being such as viewed through the lens to define rings or endless bands or zones of light, one within the other around a central zone. Such a system may be used with color screens appropriate to the two, three or four color systems and such screens may be interposed as near the focal planes as practical.

In order that the invention may be the more readily understood reference is made to the accompanying drawings in which:—

Fig. 1 illustrates diagrammatically the general lay-out of the system.

Figs. 2 and 3 are face views of the reflectors.

Fig. 4 is an elevation of Fig. 1 looking in the direction of the arrow A.

Figure 5:
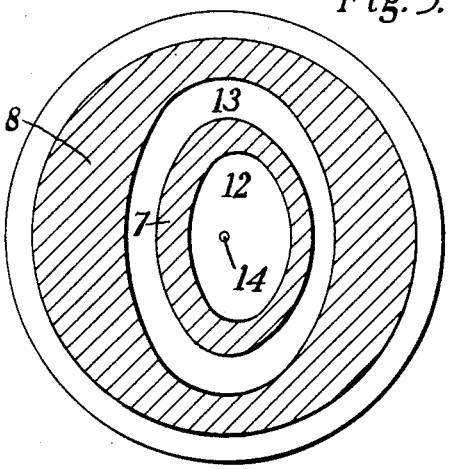
Fig. 5 is a view of the division of the light as seen through the lens aperture.

Referring to the drawings, 1 and 2 are optical flats which are conveniently and advantageously polished to a mirror surface, the centre reflector being of disc form, slightly elliptical in contour, and mounted at a suitable angle to the optical axis, so as to divert by reflection a determined portion of the image carrying rays, and form a complete image through the red filter 3 to the appertaining focal plane 4.

The second optical flat is in the form of an annulus 2, slightly elliptical in contour and mounted in such a position about the optical axis, and at a suitable angle, so as to divert by reflection a determined portion of the image carrying rays, and form a second complete image through the blue filter 5 to the appertaining focal plane 6, this combination of reflectors being mounted and provided with the necessary adjustments to enable the combination to be corrected in all directions.

The third image is formed by unobstructed image carrying rays from two zones 7, 8 of the lens 9, one zone 7 being in the form of an annulus defined by the periphery of the disc reflector 1 and the inner periphery of the ring reflector 2, and the other zone 8, permitting marginal rays of the lens to go to assist in forming the third image, being defined by the outer contour of the ring reflector 2, whereby such marginal rays fall on the same plane 10 as the annulus-controlled rays of the first zone, to form a complete image through the green filter 11 to the appertaining focal plane.

In viewing the zones through the lens it will be observed that the central zone 12 appears red and of elliptical contour, the next zone 7 will appear green in the form of an elliptical ring, the next zone 13 will appear blue in the form of an elliptical ring, and the next zone 8 will appear green and be formed by the marginal rays of the lens with an elliptical interior.

The division of the light provides for three plates being exposed simultaneously from a single objective and may be computed by methods well known to a skilled optical instrument maker to produce substantially even exposure through the respective color screens.

In the hereinabove described preferred embodiment of the present invention the red and blue are reflected images, and the green is a direct image, and the areas of reflection and the direct rays may be so computed by well known methods as above stated, in relation to their respective filter losses, time filter factors and the losses due to light reflection coupled with the focal length of the particular objective used and the full working aperture thereof, as to provide with one objective, a simultaneous exposure of three plates, at a speed capable of taking moving objects, the resultant plates being evenly exposed.

The correct apportionment of the light to the respective focal planes is determined by the shape and positioning of the two reflectors 1 and 2 which is such that each plate receives its correct proportion of the emergent cone of light and that the ring reflector 2 will not obstruct the proportion of light to the disc reflector 1.

To this end the ring reflector 2 is mounted with the disc reflector 1 slightly projecting through the centre and offset from the true optical axis in the direction of the reflected rays to the focal plane 4, the ring reflector 2 being also offset in the same direction and the disc reflector being further offset towards the rear of the ring reflector position.

The shape or contour of the two reflectors for the given objective illustrated to produce images on sensitive plates of rectangular form is shown in Figs. 2 and 3. The shape of the ring reflector is such that the width of the ring bears a progressive increase from a minimum at $K^1$ to a maximum at $L^1$.

The layout illustrated in Fig. 1 shows diagrammatically the division of the main beam of light by the reflectors, and also shows how the positions of the reflectors are determined.

The entrant rays D, D, C, C, which emerge from the lens in cones of image forming light terminating at $C^1$, $D^1$ at the focal plane 10 at the margins of the plate, represent the characteristic of the given objective illustrated in the drawings at full aperture focussed at infinity.

The entrant rays AA—BB, which are converged by the lens to $A^1 B^1$ represent the selected angle of vision of the objective; $A^1 B^1$ being the shorter dimension of the rectangular plate.

The outer entrant rays D, C indicate the inclusive working angle of the objective and cover the longer dimension of the rectangular plate, these rays crossing at a point X on the optical axis behind the lens. This point X, and the cone of emergent image-forming light S, G, H representing an image at infinity at full aperture on the optical axis, form data which assists in determining the position and shape of the intersecting reflectors.

The point X defines the position along the optical axis of the line $K^4 L^4$ which determines the plane of the ring reflector surface 2 which position is such that the distance from the point where this line intersects the optical axis to the point X is equal to the distance between the point X and the last face of egress of the objective. This point is important for the reason that if the line $K^4 L^4$ intersects the optical axis too near to the objective the centre of the plate loses density and sharpness of definition.

The cone of lights S, G, H is divided by a line at approximately 45° to the optical axis in such a position that the dimension K, L will make contact with the lines $C^1$ X and $D^1$ X and the total length of the line $K^3 L^3$ represents the sum of three total factor units which comprise the time filter factors and losses due to light reflection, and the dimension KL as the third factor.

The positioning of the ring reflector 2 on the line $K^4 L^4$ also provides that the dimension of this line must represent the sum total of the three factor units, the sum of the distances $K^1$, $K^2$ and $L^1$, $L^2$ being one of the three factors.

By correctly positioning and shaping the reflectors 1 and 2 the light is properly apportioned to the respective plates in spite of variations in the cross sectional area of the convergent cone due to changes of the angle of vision of the objective.

The construction and positioning of the light-dividing elements as described provide for the illumination of rectangular plates; with the use of square plates the contour of the reflectors 1 and 2 would conform more to the form of a circular disc in the case of the reflector 1, and in the case of reflector 2 to the form of circular annulus with the perforated portion eccentric with the outer contour and positioned as previously explained.

Figure 6:
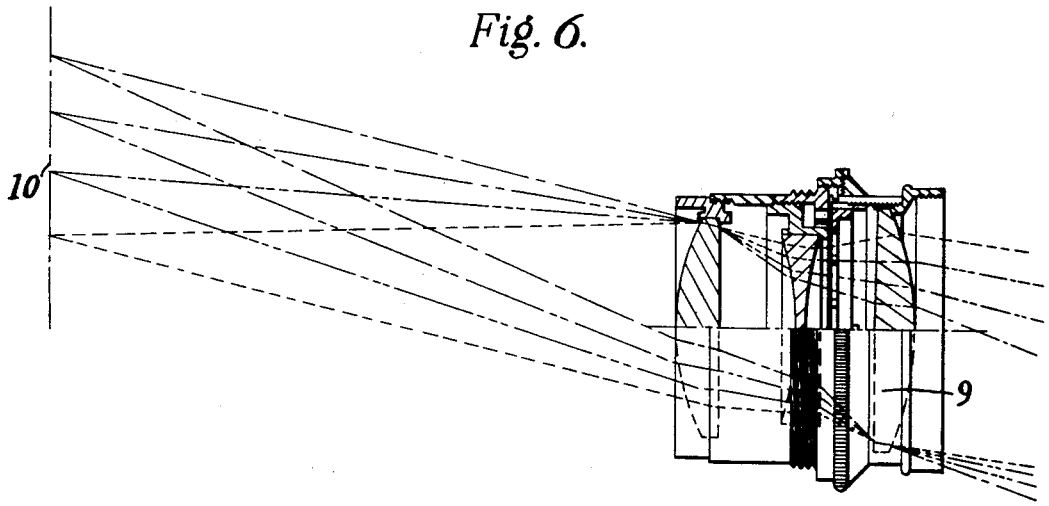
Fig. 6 shows a lens of a known type suitable for use with the present system and indicates the passage of certain of the rays passing through such lens.

Fig. 6 shows a known form of objective suitable for use with the optical dividing system according to this invention.

For the purpose of producing four pictures, the direct rays passing through the annulus formed between the disc and the ring, are reflected by the addition of a ring reflector behind the system and in this form four plates will be exposed simultaneously.

The second ring reflector is arranged outside the first ring and inclined so as to reflect the light above or below, as convenient, to form the fourth image in a plane parallel with the plane containing the optical centres of the normal three images.

In this system all the light received from the lens (with the exception in certain cases of a small proportion which may be cut off by the supports for the disc and ring) is utilized to form the images, and in full daylight, using a "f3.5" lens, good results are obtained with an exposure of 1/100 second.

In the system above described the direct image is green, the image formed by the disc, red, and that formed by the ring, blue.

For a given size plate it should be noted that an increase in aperture of the lens will not alter the balance of illumination on the red or green plate. There will however be a slight increase in intensity of illumination towards the edge remote from the lens of the blue plate, but in actual practice this is of no importance.

The resulting color sensation pictures may be utilized in any of the well known ways to produce photographic or cinematographic effects in color.

The present invention also provides for the inspection of the focal definition of the image while at the same time leaving the camera ready for exposure. To this end a small perforation 14 is provided in the disc reflector 1, to allow a pencil of light to pass through and be reflected by a small mirror 15 and conveniently a further mirror 16 to an eye piece 17, which is automatically focussed with the focussing mechanism of the camera. The view seen in the eye piece is a section of the green image and a green filter is fitted on the focussing screen 18.

Where the optical system is used in connection with artificial light the positions described of the filters with respect to the optical dividing system are substantially true for arc lights but if half watt lamps are used there will be a preponderance of red actinic rays and it will generally be found satisfactory to reverse the positions of the red and blue filters.

The invention is well suited for use with lenses of short focal length.

What I claim is:—

1. An optical system for casting multiple images by simultaneous exposure from the same point of view comprising an objective and a light dividing system positioned behind the objective; said light dividing system consisting of a pair of plane mirrors lying in intersecting planes; one of said mirrors being of ring-like form and substantially encircling the other mirror; said mirrors dividing the main beam transmitted by the lens into four sections; two of such sections being reflected by said mirrors to form two images and two sections passing unobstructed by the system on the optical axis and combining to form a single direct further image; one of said unobstructed sections being formed by the marginal rays from the lens.

2. In connection with color photography or cinematography an optical system for casting multiple images by simultaneous exposure from the same point of view comprising an objective and a light dividing system positioned behind the objective; said light dividing system consisting of a pair of polished metal reflectors lying in intersecting planes; one of said reflectors being of ring-like form and substantially encircling the other reflector; said reflectors dividing the main beam transmitted by the lens into four sections; two of such sections being reflected by said reflectors to form two images and two sections passing unobstructed by the system on the optical axis and combining to form a single direct further image; one of said unobstructed sections being formed by the marginal rays from the lens.

3. An optical system for casting multiple images by simultaneous exposure from the same point of view comprising an objective and a light dividing system positioned behind the objective; said light dividing system consisting of a pair of plane mirrors lying in intersecting planes; one of said mirrors being of ring-like form and substantially encircling the other mirror; said mirrors dividing the main beam transmitted by the lens into four sections; two of such sections being reflected by said mirrors to form two images and two sections passing unobstructed by the system on the optical axis and combining to form a single direct further image; one of said unobstructed sections being formed by the marginal rays from the lens, said mirrors being shaped and positioned so as to apportion the light correctly for the multiple images.

4. An optical system for casting multiple images by simultaneous exposure from the same point of view comprising an objective and a light dividing system positioned behind the objective; said light dividing system consisting of a pair of plane non-refracting front surface reflecting mirrors lying in intersecting planes; one of said mirrors being a disc form; the other of said mirrors being of ring-like form and substantially encircling the disc mirror; said mirrors dividing the main beam transmitted by the lens into four sections; two of such sections being reflected by said mirrors to form two images and two sections passing entirely unobstructed by the system on the optical axis and combining to form a single direct image; one of said unobstructed sections passing through an annular space between said mirrors, and the other unobstructed section consisting of the marginal rays from the lens, passing by the outer periphery of the ring reflector.

5. An optical system for casting multiple images by simultaneous exposure from the same point of view comprising an objective and a light dividing system positioned behind the objective; said light dividing system consisting of a pair of plane non-refracting front surface reflecting mirrors lying in intersecting planes; one of said mirrors being of disc form; the other of said mirrors being of ring-like form and substantially encircling the disc mirror; said mirrors being each offset with respect to the optical axis in the direction of the rays from the disc reflector; said mirrors dividing the main beam transmitted by the lens into four sections; two of such sections being reflected by said mirrors to form two images and two sections passing entirely unobstructed by the system on the optical axis and combining to form a single direct image; one of said unobstructed sections passing through an annular space between said mirrors and the other unobstructed section, consisting of the marginal rays from the lens, passing by the outer periphery of the ring reflector.

6. An optical system for casting multiple images by simultaneous exposure from the same point of view comprising an objective and a light dividing system positioned behind the objective; said light dividing system consisting of a pair of plane non-refracting front surface reflecting mirrors lying in intersecting planes; one of said mirrors being of disc form; the other of said mirrors being of ring-like form and substantially encircling the disc mirror; said disc like mirror being offset towards the rear of the ring-like reflector position; said mirrors dividing the main beam transmitted by the lens into four sections; two of such sections being reflected by said mirrors to form two images and two sections passing entirely unobstructed by the system on the optical axis and combining to form a single direct image; one of said unobstructed sections passing through an annular space between said mirrors and the other unobstructed section consisting of the marginal rays from the lens, passing by the outer periphery of the ring reflector.

7. An optical system for casting multiple images by simultaneous exposure from the same point of view comprising an objective and a light dividing system positioned behind the objective ; said light dividing system consisting of a pair of plane non-refracting front surface reflecting mirrors lying in intersecting planes; one of said mirrors being of disc form; the other of said mirrors being of ring-like form and substantially encircling the disc mirror; said mirrors being each offset with respect to the optical axis in the direction of the rays from the disc reflector; said disc-like reflector being offset towards the rear of the ring-like reflector position; said mirrors dividing the main beam transmitted by the lens into four sections; two of such sections being reflected by said mirrors to form two images and two sections passing entirely unobstructed by the system on the optical axis and combining to form a single direct image; one of said unobstructed sections passing through an annular space between said mirrors and the other unobstructed section, consisting of the marginal rays from the lens, passing by the outer periphery of the ring reflector.

8. An optical system for casting multiple images by simultaneous exposure from the same point of view comprising an objective and a light dividing system positioned behind the objective; said light dividing system consisting of a pair of plane non-refracting front surface reflecting mirrors lying in intersecting planes; one of said mirrors being of disc form; the other of said mirrors being of ring-like form and substantially encircling the disc mirror; said ring-like reflector being of a width which increases from a minimum at a section nearest the objective to a maximum at a section diametrically opposite to the first section; said mirrors dividing the main beam transmitted by the lens into four sections; two of such sections being reflected by said mirrors to form two images and two sections passing entirely unobstructed by the system on the optical axis and combining to form a single direct image; one of said unobstructed sections passing through an annular space between said mirrors and the other unobstructed section consisting of the marginal rays from the lens, passing by the outer periphery of the ring reflector.

9. An optical system for casting multiple images by simultaneous exposure from the same point of view comprising an objective and a light dividing system positioned behind the objective; said light dividing system consisting of a pair of plane non refracting front surface reflecting mirrors lying in intersecting planes; one of said mirrors being of disc form; the other of said mirrors being of ring-like form and substantially encircling the disc mirror; said mirrors having minor and major axes and being each offset with respect to the optical axis in the direction of the rays from the disc mirror; said disc-like reflector being offset towards the rear of the ring-like reflector position; said ring-like reflector being of a width which increases from a minimum at a section nearest the lens to a maximum at a section diametrically opposite the first section; said mirrors dividing the main beam transmitted by the lens into four sections; two of such sections being reflected by said mirrors to form two images and two sections passing unobstructed by the system on the optical axis and combining to form a single direct image; one of said unobstructed sections being formed by the marginal rays from the lens.

10. An optical system for casting multiple images by simultaneous exposure from the same point of view comprising an objective and a light dividing system positioned behind the objective; said light dividing system consisting of a pair of plane mirrors lying in intersecting planes; one of said mirrors being of ring-like form and substantially encircling the other mirror; said mirrors dividing the main beam transmitted by the lens into four sections, two of such sections being reflected by said mirrors to form two images and two sections passing unobstructed by the system on the optical axis; one of said unobstructed sections passing directly to the focal plane of a third image; a mirror disposed in the path of the other of said unobstructed sections to reflect light to form a fourth image; one of said unobstructed sections being formed by the marginal rays from the lens.

11. An optical system for casting multiple images by simultaneous exposure from the same point of view comprising an objective and a light dividing system positioned behind the objective; said light dividing system consisting of a pair of plane non-refracting front surface reflecting mirrors lying in intersecting planes; one of said mirrors being of disc form having a medial perforation; and the other of said mirrors being of ring-like form and substantially encircling the disc mirror; a further reflector disposed behind said disc mirror to reflect a pencil of rays passing through the perforation therein to an eye piece for focussing the system; said intersecting mirrors dividing the main beam transmitted by the lens into four sections; two of such sections being reflected by said mirrors to form two images and two sections passing entirely unobstructed by the system on the optical axis and combining to form a single direct image; one of said unobstructed sections passing through an annular space between said mirrors and the other unobstructed section constituting the marginal rays from the lens passing by the outer periphery of the ring mirror.

12. An optical system for casting multiple images by simultaneous exposure from the same point of view comprising an objective and a light dividing system positioned behind the objective; said light dividing system consisting of a pair of plane mirrors lying in intersecting planes; one of said mirrors being of ring-like form and substantially encircling the other mirror; said mirrors dividing the main beam transmitted by the lens into four sections; two of such sections being reflected by said mirrors to form two images and two sections passing unobstructed by the system on the optical axis and combining to form a single direct further image.

13. An optical system for casting multiple images by simultaneous exposure from the same point of view comprising an objective and a light dividing system positioned behind the objective; said light dividing system consisting of a pair of plane mirrors lying in intersecting planes; one of said mirrors being of ring-like form and substantially encircling the other mirror; said mirrors dividing the main beam transmitted by the lens into four sections; two of such sections being reflected by said mirrors to form two images and two sections passing unobstructed by the system on the optical axis; one of said unobstructed sections passing directly to the focal plane of a third image; a reflector disposed in the path of the other of said unobstructed beams to reflect light to form a fourth image.

14. An optical system for casting multiple images by simultaneous exposure from the same point of view comprising an objective and a light dividing system positioned behind the objective; said light dividing system consisting of a pair of plane non-refracting front surface reflecting mirrors lying in intersecting planes; one of said mirrors being of disc form; the other of said mirrors being of ring-like form and substantially encircling the disc mirror; said mirrors being each offset with respect to the optical axis in the direction of the rays from the disc reflector; said disc-like reflector being offset towards the rear of the ring-like reflector position; said mirrors dividing the main beam transmitted by the lens into four sections; two of such sections being reflected by said mirrors to form two images and two sections passing entirely unobstructed by the system on the optical axis; one of said unobstructed sections passing through an annular space between said mirrors and the other unobstructed section, consisting of the marginal rays from the lens, passing by the outer periphery of the ring reflector; one of said unobstructed sections passing directly to the focal plane of a third image; a reflector disposed in the path of the other of said unobstructed beams to reflect light to form a fourth image.

ALBERT GEORGE HILLMAN.